(12) United States Patent  (10) Patent No.: US 7,614,590 B2
Boville  (45) Date of Patent: Nov. 10, 2009

(54) ATTACHMENT DEVICE FOR FIXING VARIOUS ELEMENTS TO A SUPPORT

(75) Inventor: Daniel Boville, Paris (FR)

(73) Assignee: A. Raymond et Cie, Grenoble Cedex (FR)

( * ) Notice: Subject to any disclaimer, the term of this patent is extended or adjusted under 35 U.S.C. 154(b) by 415 days.

(21) Appl. No.: 11/257,065

(22) Filed: Oct. 25, 2005

(65) Prior Publication Data

US 2006/0102820 A1   May 18, 2006

(30) Foreign Application Priority Data

Nov. 17, 2004   (FR)   .................................... 0412228

(51) Int. Cl.
   *F16L 3/24*   (2006.01)
(52) U.S. Cl. .................. 248/72; 248/228.2; 248/228.6; 248/231.31; 248/231.71; 248/214; 248/230.1; 248/63; 248/74.1; 248/62; 248/74.3; 248/216.1; 248/217.2; 248/217.3
(58) Field of Classification Search .............. 248/228.2, 248/228.6, 231.31, 231.71, 214, 230.1, 72, 248/63, 74.1, 62, 74.3, 216.1, 217.2, 217.3
   See application file for complete search history.

(56) References Cited

U.S. PATENT DOCUMENTS

| 1,505,220 | A | * | 8/1924 | Shay | 248/295.11 |
|---|---|---|---|---|---|
| 1,878,850 | A | * | 9/1932 | Hilgers | 108/28 |
| 2,089,452 | A | * | 8/1937 | Utley | 248/538 |
| 2,659,561 | A | * | 11/1953 | Kindorf | 248/228.6 |
| 2,699,601 | A | * | 1/1955 | Darnell | 269/40 |
| 3,021,106 | A | * | 2/1962 | Kramer | 248/231.71 |
| 3,126,182 | A | * | 3/1964 | Stamper | 248/72 |
| 3,131,447 | A | * | 5/1964 | Tinnerman | 248/231.81 |
| 3,136,515 | A | * | 6/1964 | Potruch | 248/62 |
| 3,276,800 | A | * | 10/1966 | Loudon et al. | 403/397 |
| 3,298,646 | A | * | 1/1967 | Buren, Jr. | 248/72 |
| RE26,247 | E | * | 8/1967 | Tinnerman | 248/72 |
| 3,341,909 | A | * | 9/1967 | Havener | 24/486 |
| 3,730,466 | A | * | 5/1973 | Swanquist | 248/216.4 |
| 5,127,577 | A | * | 7/1992 | Lynch et al. | 238/378 |
| 5,836,559 | A | * | 11/1998 | Ronci | 248/230.3 |
| 6,513,772 | B2 | * | 2/2003 | Gary et al. | 248/231.91 |
| 7,431,252 | B2 | * | 10/2008 | Birli et al. | 248/221.11 |
| 2007/0295871 | A1 | * | 12/2007 | Moreau et al. | 248/214 |

* cited by examiner

*Primary Examiner*—J. Allen Shriver, II
*Assistant Examiner*—Nkeisha J Smith
(74) *Attorney, Agent, or Firm*—Oliff & Berridge, PLC (57) ABSTRACT

An attachment device comprises a metal part obtained by cutting and folding a metal plate or sheet, and shaped as a rider designed to be fitted astride a metal support in the form of a beam or a bar. The metal part comprises a U-shaped flange having two side faces forming a jaw equipped with a series of spigots staggered along the top arms and with a pair of flexible teeth acting as springs at the ends of the bottom arms. The holding strength is enhanced, and the two flexible teeth coming into contact against the bottom face of the support enables several thicknesses of the support to be managed.

9 Claims, 12 Drawing Sheets

ATTACHMENT DEVICE FOR FIXING VARIOUS ELEMENTS TO A SUPPORT

BACKGROUND OF THE INVENTION

The invention relates to an attachment device comprising a metal part obtained by cutting and folding a metal plate or sheet having a predetermined thickness, said part being shaped as a rider designed to be fitted astride a metal support in the form of a beam or a bar, and comprising securing means for fixing or suspending various elements.

STATE OF THE ART

Two main types of attachment devices exist for fixing various elements by hooking or suspending on metal beams, in particular in the building sector.

A first type of attachment uses a hardened steel rider designed to be engaged on the metal support by means of a hammer. Such a rider in the form of a grip requires a range of several models to take account of the different thicknesses of beams or strips able to constitute the support. The nature of the elements suspended on this known attachment moreover imposes fitting of several fixing accessories, which are formed by spare parts designed to be fixed to the rider to take account of the different types and the different ways of suspending the objects or elements.

The second type of attachment uses a metal flange composed of a rigid jaw and a screw which is screwed into a tapped hole of the upper wing. Such an attachment can be adapted to suit several thicknesses of support, the screw simply has to be tightened sufficiently to come into engagement against the support. This type of known attachment has the following drawbacks:

- use of a tool (spanner or screwdriver) to perform efficient tightening of the screw onto the support;
- reduced mechanical strength of the attachment due to the leverage effect created by the screw when tightening is performed;
- compulsory use of fixing accessories when the elements are formed by threaded or smooth rods, collars, plastic straps, small chains, cables, etc. Fixing of these accessories is performed by any assembly method, in particular by riveting.

OBJECT OF THE INVENTION

The object of the invention consists in remedying the above-mentioned drawbacks, and in providing an attachment device with a high mechanical strength, able to manage several thicknesses of the support, without requiring the use of assembly tools and specific accessories for fixing the elements, and able to support large suspended weights without any risk of tear-off.

The device according to the invention is characterized in that the part comprises a U-shaped flange having two side faces forming a jaw which is equipped with a series of spigots staggered along the top arms of the flange and with a pair of flexible teeth acting as springs at the ends of the bottom arms.

The spigots digging into the top face of the support and the spring effect of the two flexible teeth enhance the holding strength by opposing any sliding movement of the part in the inserted position. The two flexible teeth coming into contact against the bottom face of the support enable several thicknesses of the support to be managed.

According to a preferred embodiment, the two teeth are folded at right angles towards the outside of the gap separating the two side faces, each tooth being able to bend downwards by flexible deformation when the jaw is inserted on the support. Each tooth presents a predetermined length enabling a deflection of several millimetres depending on the thickness of the support. The flange of the part comprises a top face and a front face joined to the side faces, the top face being formed by a part of each top arm folded at right angles.

Other features can be used either alone or in combination:
- a gap extends longitudinally in the middle of the top face up to a passage enabling an element fixed to the inside wall of the front face to be inserted;
- the front face of the part can be provided with a circular aperture for latching or passage of an element, and comprises an outwardly folded latching nose at the top part thereof;
- the flexible teeth are arranged symmetrically with respect to the vertical mid-plane of symmetry;
- the top face of the part comprises a first semi-circular rim situated facing a second semi-circular rim arranged at the top of the front face;
- the part comprises intermediate tabs directed inside the flange towards the front face to enable pre-positioning of a rod passing through the flange.

BRIEF DESCRIPTION OF THE DRAWINGS

Other advantages and features will become more clearly apparent from the following description of an embodiment of the invention given as a non-restrictive examples only and represented in the accompanying drawings, in which.

DESCRIPTION OF PREFERRED EMBODIMENTS

With reference to FIGS. 1 to 5, an attachment device 10 comprises a metal part 11 shaped as a rider to be fitted edgewise onto a support 12 so as to enable suspension or fixing of various elements. The support 12 (represented schematically by broken lines in FIG. 2) is formed for example by a straight metal beam or bar of rectangular cross-section having two flat parallel opposite faces 12a, 12b.

The metal part 11 is obtained by cutting a metal plate 13 or sheet having a small thickness. Cutting is performed according to an outline represented in FIG. 5, which presents a double E-shaped structure symmetrical with respect to the vertical mid-plane of symmetry P. The double E-shaped structure is composed of a common body 13a provided on each side thereof with two top arms 13b, two intermediate tabs 13c and two bottom arms 13d.

The metal plate 13 is then folded around several folding lines to achieve the metal part 11 (FIG. 1) of the attachment device 10.

Figure 1:
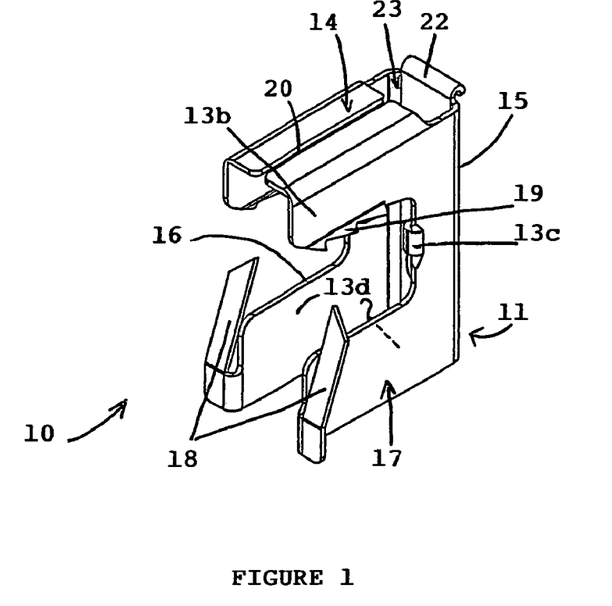
FIG. 1 is a perspective view of the flange of the attachment device according to the invention.

The folded metal part 11 forms a U-shaped flange comprising a top face 14, a front face 15 and two side faces 16, 17 parallel with respect to the plane of symmetry P. Opposite the top face 14, the bottom is open over the whole depth of the flange.

The terminal part of each bottom arm 13d is provided with a flexible tooth 18 folded outwards at right angles and able to bend downwards by flexibility when the insertion movement of the part 11 onto the support 12 takes place so as to constitute a spring. The two teeth 18 are symmetrical with respect to the mid-plane P and are situated outside the gap separating the side faces 16, 17.

The side faces 16, 17 form a C-shaped or U-shaped jaw (FIGS. 1 and 2) able to be engaged on the support 12 to ensure securing of the part 11. The width of the jaw corresponds to the gap separating the side faces 16, 17. The edge of each top arm 13b is advantageously equipped with a series of spigots 19 inclined slightly inwards to enable the spigots 19 to dig in when the insertion movement onto the support 12 takes place.

Figure 2:
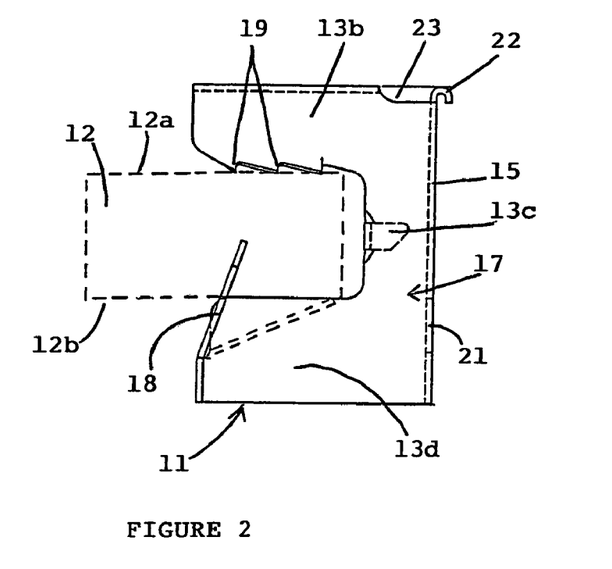
FIG. 2 shows an elevation of FIG. 1, the flexible teeth being represented in the disengaged inactive position (bold lines), and in the engaged active position (broken lines) on the support.
Figure 3A:
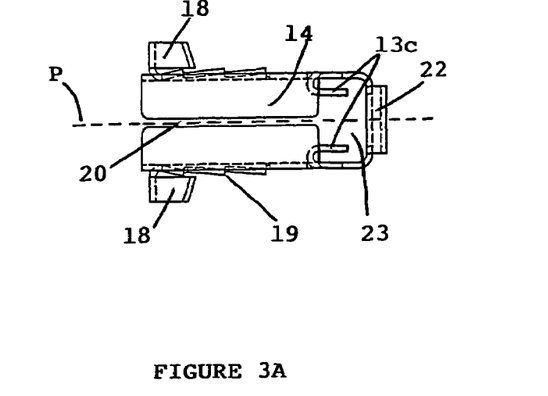
FIG. 3A is a plan view of FIG. 2.
Figure 3B:
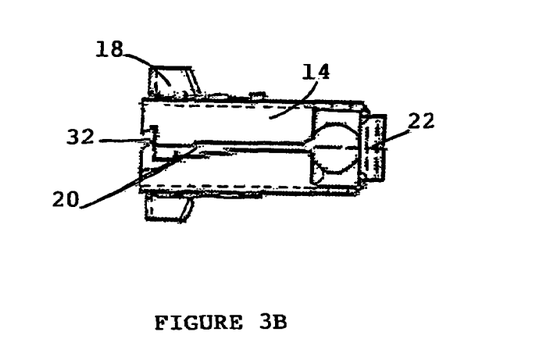
FIG. 3B is an identical view to FIG. 3A of an alternative embodiment.
Figure 4:
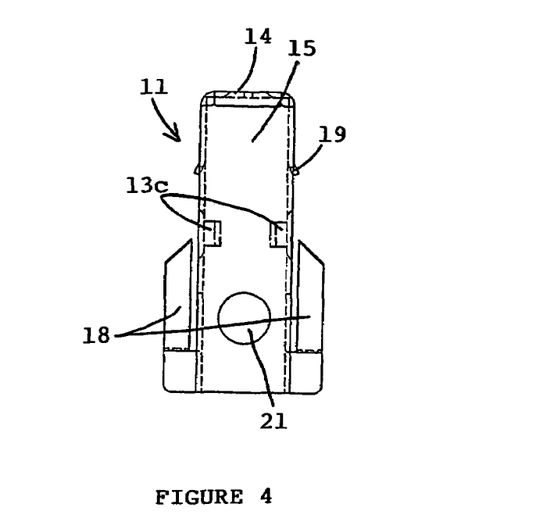
FIG. 4 is a side view of FIG. 2.
Figure 5:
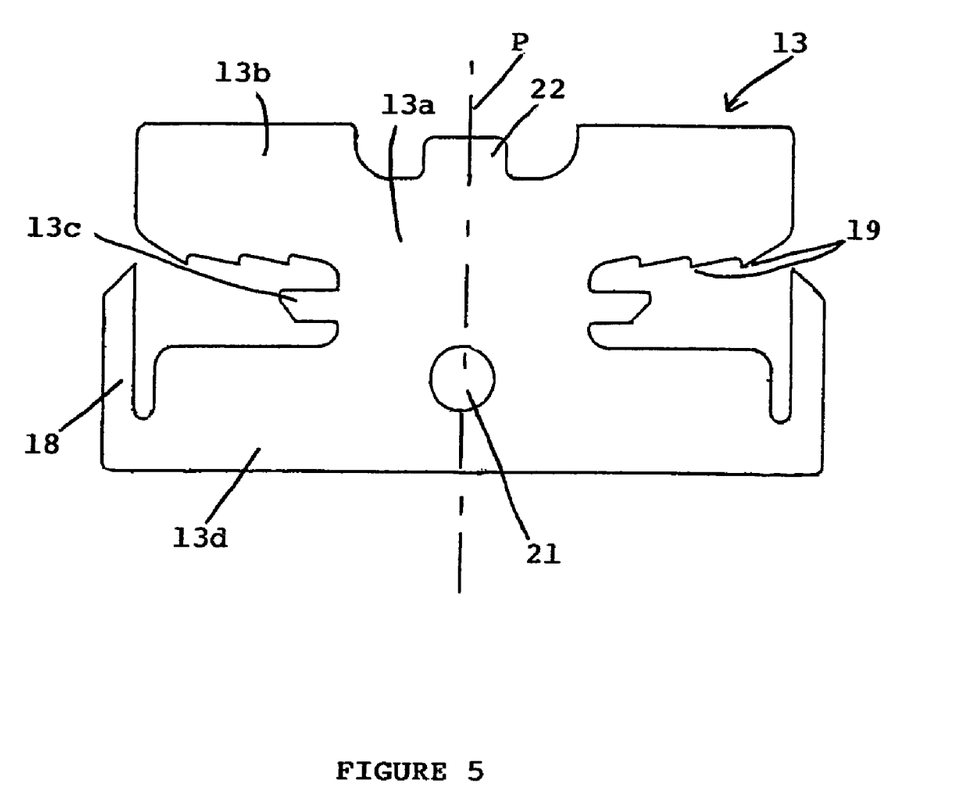
FIG. 5 shows the cut-out metal plate before folding of the part representative of the attachment device of FIG. 1.

The spigots 19 digging into the top face of the support 12 and the spring effect of the two teeth 18 enhance the holding strength by opposing any sliding movement of the part 11 in the inserted position. The two flexible teeth 18 coming into contact against the bottom face of the support 12 enable several thicknesses of the support 12 to be managed, without requiring the use of specific tools or adjustment means. The length of each tooth 18 is chosen for this purpose to enable a maximum deflection of about 7 mm.

The top face 14 of the part 11 is formed by a part of each top arm 13b folded at right angles. According to FIG. 3A, a straight gap 20 extends longitudinally in the mid-plane of symmetry P. According to the alternative embodiment of FIG. 3B, the gap 20 comprises an inclined part terminated by a securing system 32 by latching situated opposite the nose 22.

The front face 15 of the part 11 comprises a fraction of the body 13a which is equipped at the base with a circular fixing aperture 21 and a nose 22 for latching to the top part.

It is clear that additional apertures can be arranged in the front face 15 and in the side faces 16, 17 to increase the attachment possibilities of elements.

The two intermediate tabs 13c are folded into the shape of pins inside the flange and are directed towards the front face 15. The presence of these internal tabs 13c enables a threaded rod or any other element passing through the flange via a passage 23 arranged between the top face 14 and the front face 15 to be positioned and guided.

Various elements, in particular threaded or smooth rods, metal collars, plastic straps, small chains, cables, etc. can be secured directly to the part 11 of the attachment device 10 without using fitting accessories. Fitting of these elements is performed after the part 11 has been fitted astride its support 12. The mechanical strength is high, which enables large suspended weights to be supported.

Figure 6:
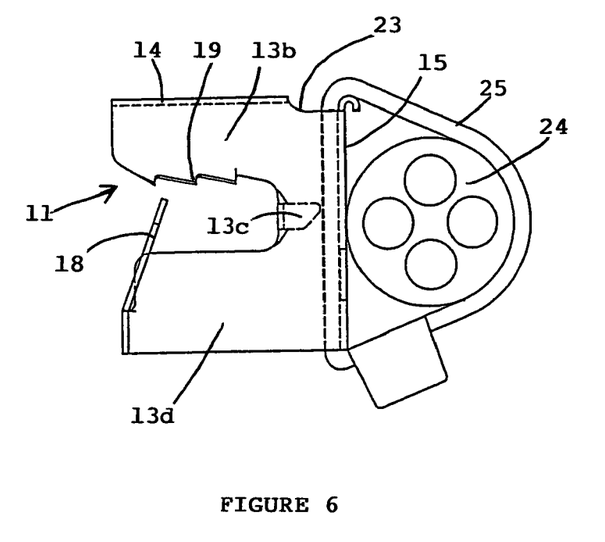
FIGS. 6 and 7 show the attachment device of FIG. 2 in the disengaged position, with a cable secured by a collar, respectively to the front face and to the top face of the flange.

In FIG. 6, an electric cable 24 can be secured to the front face 15 by the clamping action of a securing collar 25 or hoop, which passes through the passage 23 extending vertically inside the flange.

Figure 7:
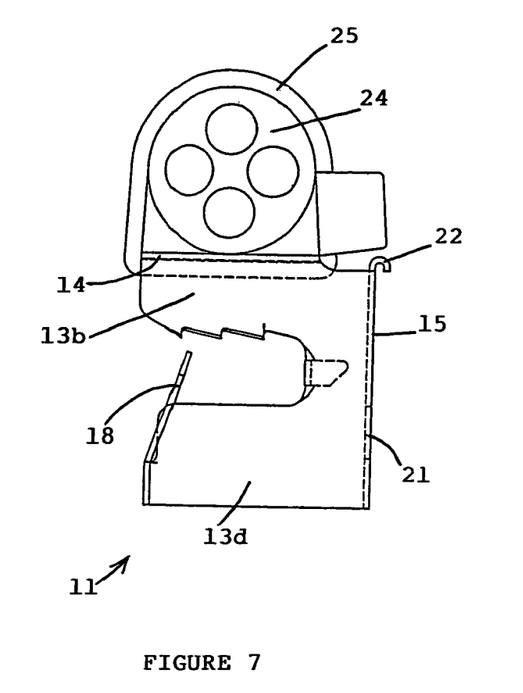

In FIG. 7, the electric cable 24 is fitted onto the top face 14 of the part 11, passage of the collar 25 in this case taking place horizontally inside the folded part of the top arms 13b.

Figure 8:
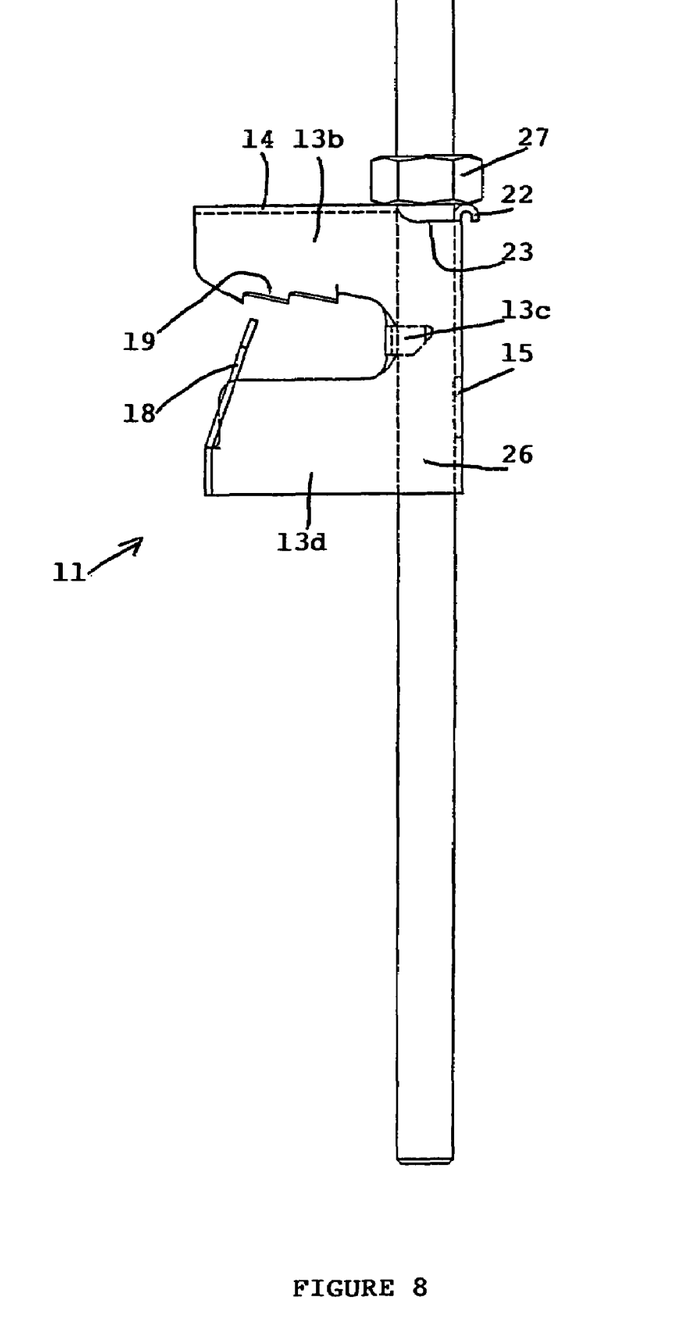
FIG. 8 represents the attachment device of FIG. 2 with a threaded rod passing through the flange in a vertical direction.

In FIG. 8, the element fixed to the part 11 is formed by a threaded rod 26 that passes through the passage 23 being pre-positioned in the vertical position by two intermediate tabs 13c. A lock-nut 27 is screwed onto the threaded part of the rod 26 and bears on the nose 22 to perform mechanical fixing.

Figure 9:
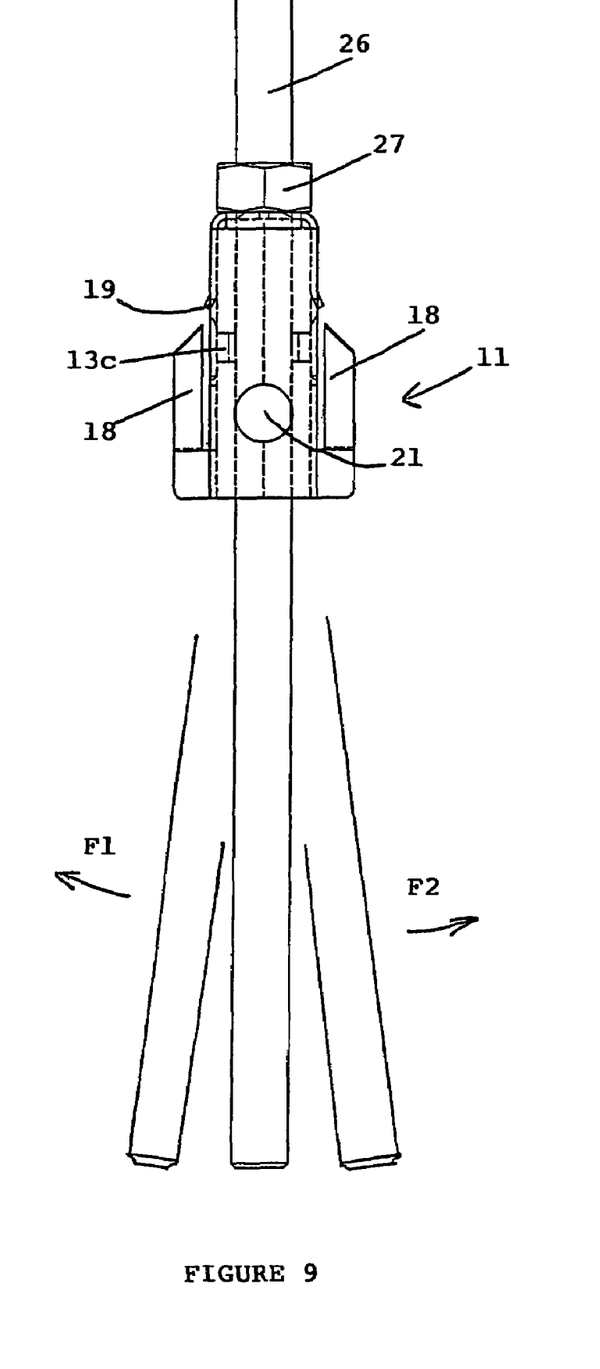
FIG. 9 is a side view of FIG. 8, illustrating a possibility of limited angular movement of the rod on each side of the vertical direction.

In FIG. 9, a slight deformation of the intermediate tabs 13c allows an angular movement of the rod 26 in the direction of the arrows F1 or F2. The angle of movement takes place on each side of the vertical direction and is about 10° on each side.

Figure 10:
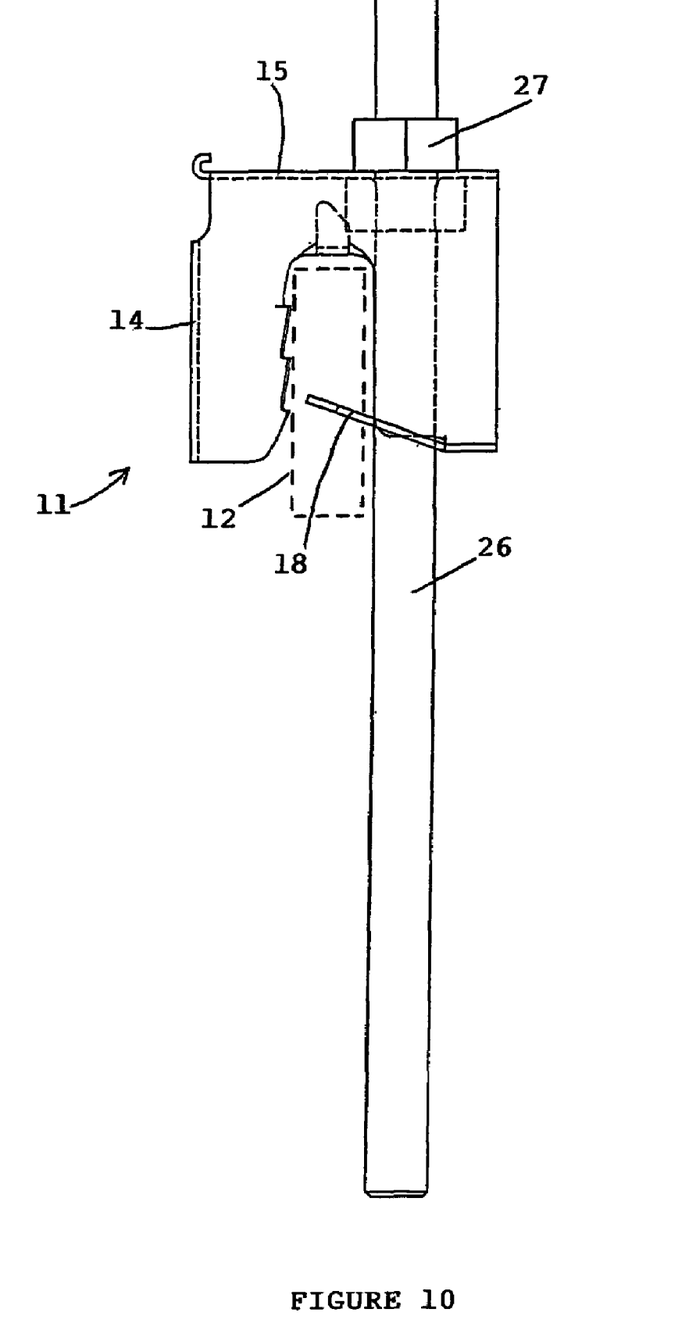
FIG. 10 illustrates another fitting of the rod passing through an aperture of the attachment device, which fits onto a reverse U-shaped vertical support.

In FIG. 10, the part 11, instead of being fitted horizontally astride the support 12, fits onto the latter in a reverse U-shape. The rod 26 passes through the aperture 21 in a direction perpendicular to the front face 15.

Figure 11:
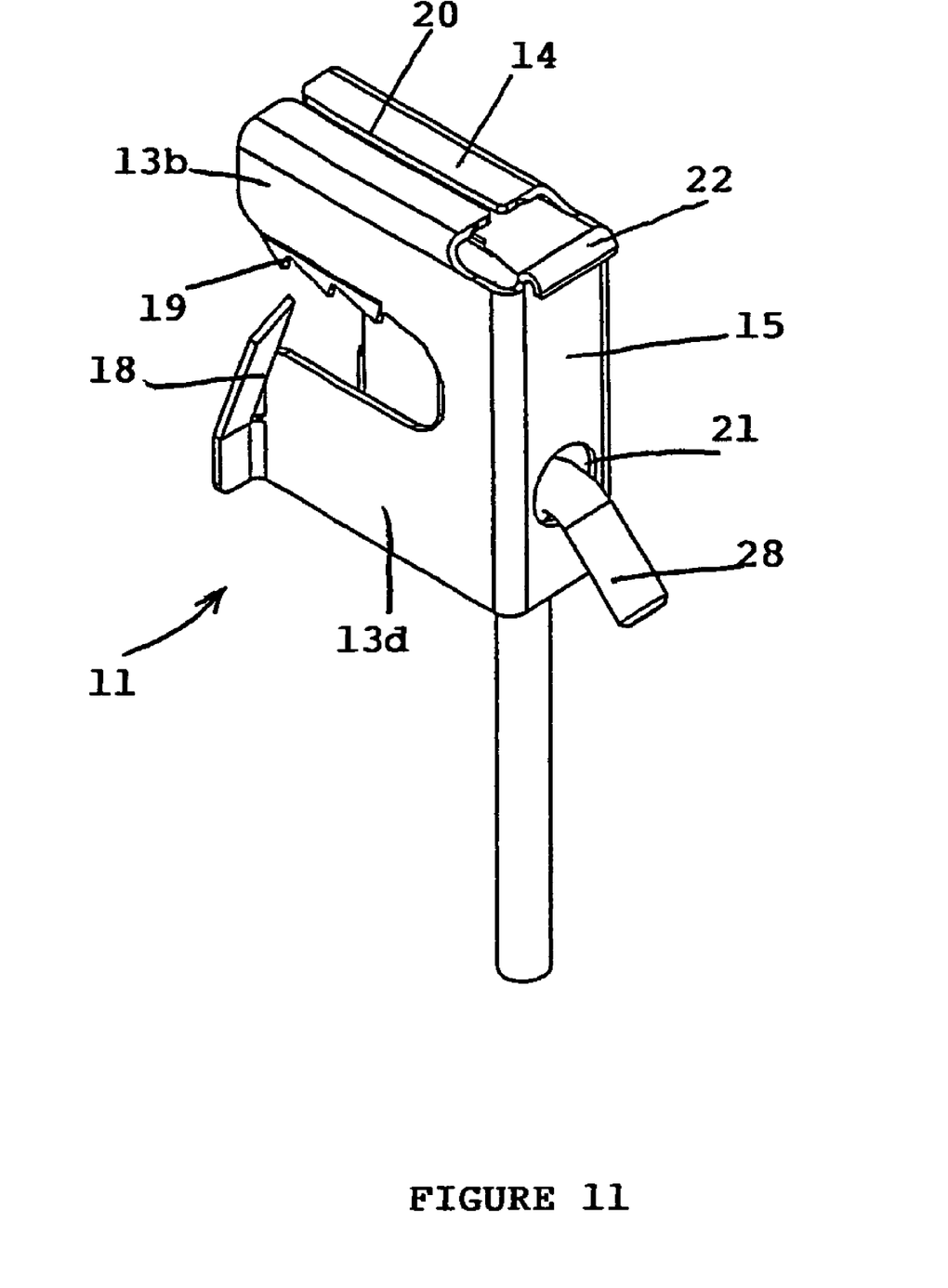
FIG. 11 shows a rod secured by a hook in an aperture of the front face of the attachment device of FIG. 1.

In FIG. 11, a hook 28 of a smooth rod is latched in the aperture 21 of the front face 15 via the inside of the part 11. It is clear that the hook 28 can be replaced by a chain or any other suspension accessory.

According to the alternative embodiment of FIGS. 12 to 16, the structure of the part 110 differs from that of FIGS. 1 to 5 in that the plate 130, instead of having a nose 22 like the plate 13, comprises a curved cut-out 122. The ends of the tabs 13c are striated so as to form a comb. The rest of the part 110 is identical to the structure of the part 11 of FIGS. 1 to 5.

Figure 12:
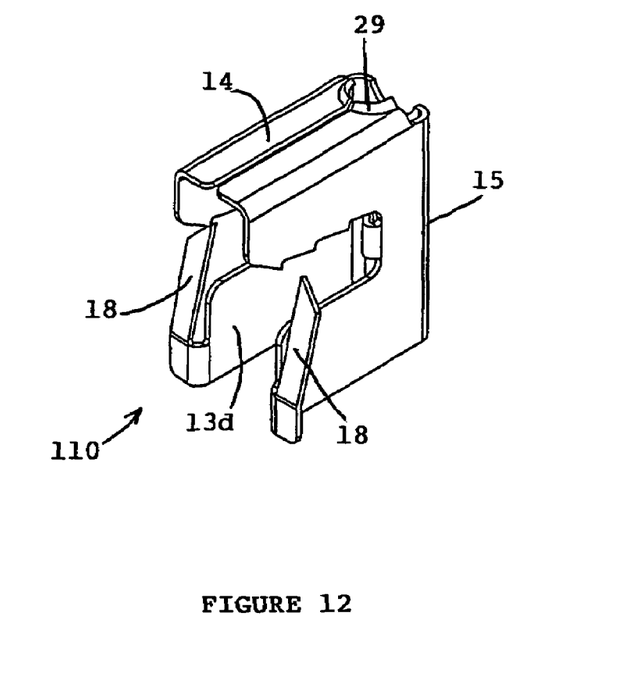
FIGS. 12 to 16 are respective identical views of FIGS. 1 to 5 of an alternative embodiment of the attachment device.
Figure 13:
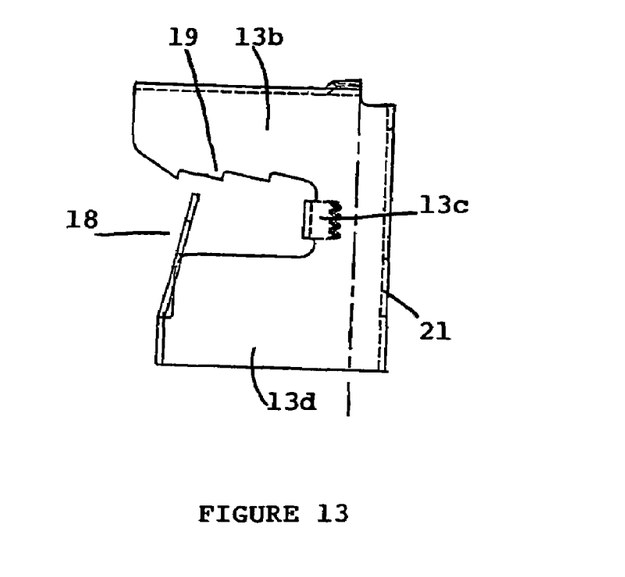
Figure 14:
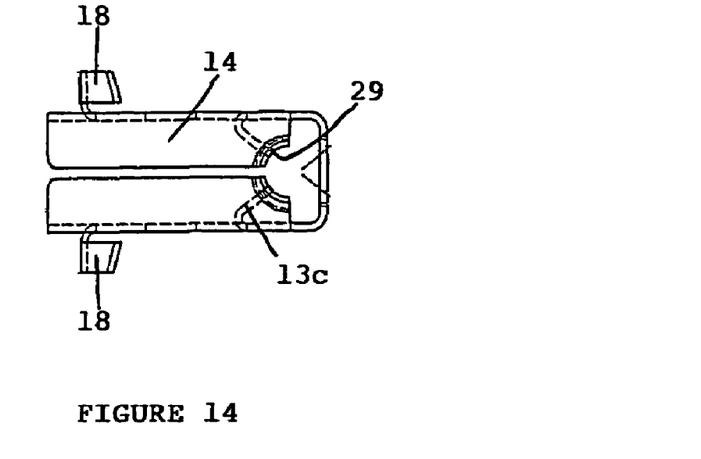
Figure 15:
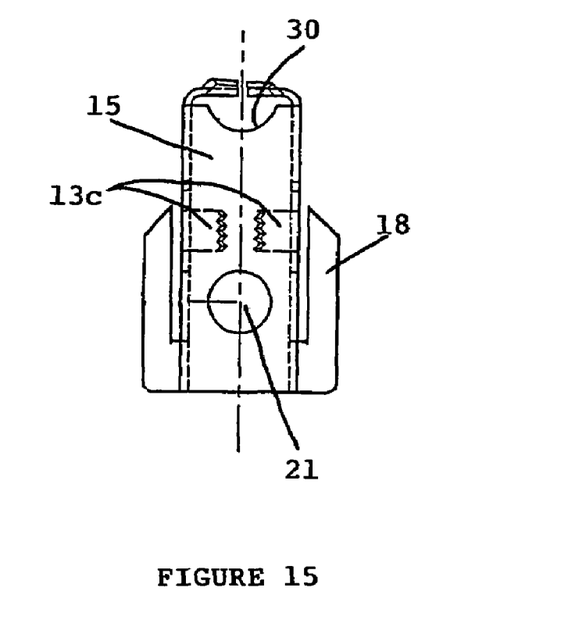
Figure 16:
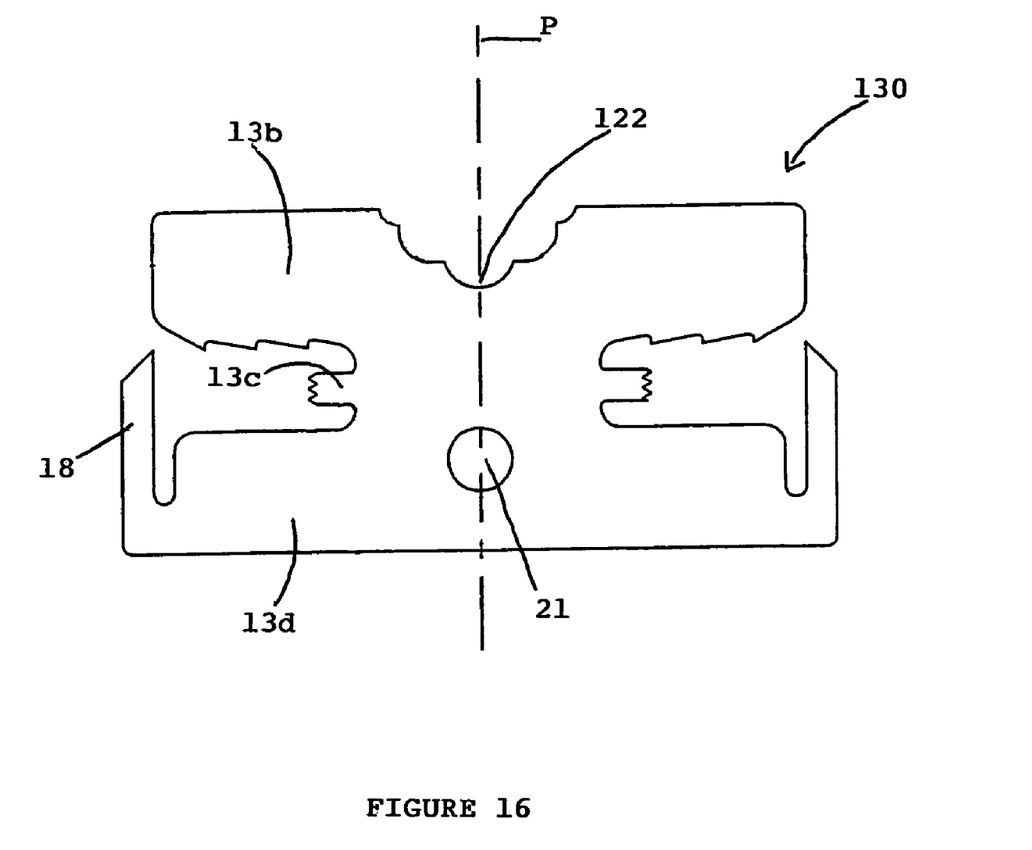

The part 110 enables a threaded rod 26 to be secured without using a lock-nut. After folding, the cut-out 122 forms a first semi-circular rim 29 in the top face 14 and a semi-circular rim 30 at the top of the front face 15.

Figure 17:
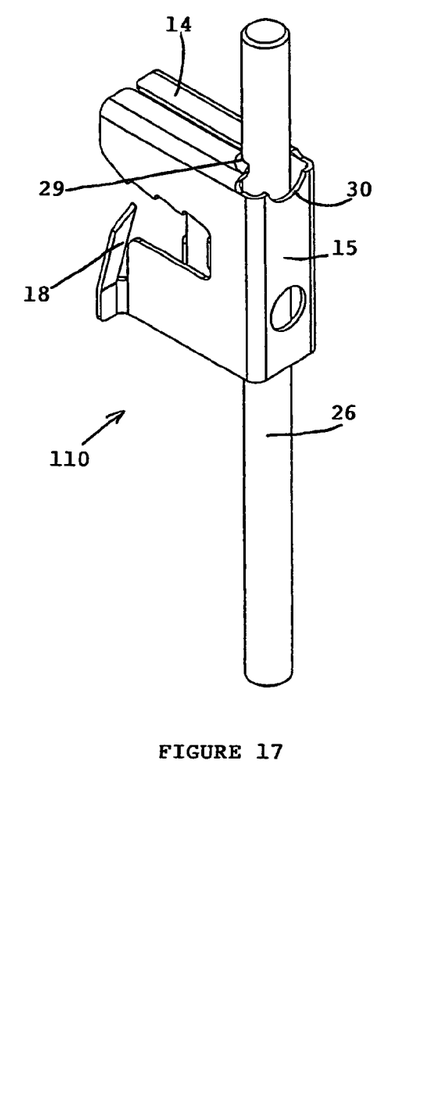
FIGS. 17 and 18 represent the attachment device of FIG. 12 with a threaded rod secured without a lock-nut, respectively in the vertical direction and in the inclined position.
Figure 18:
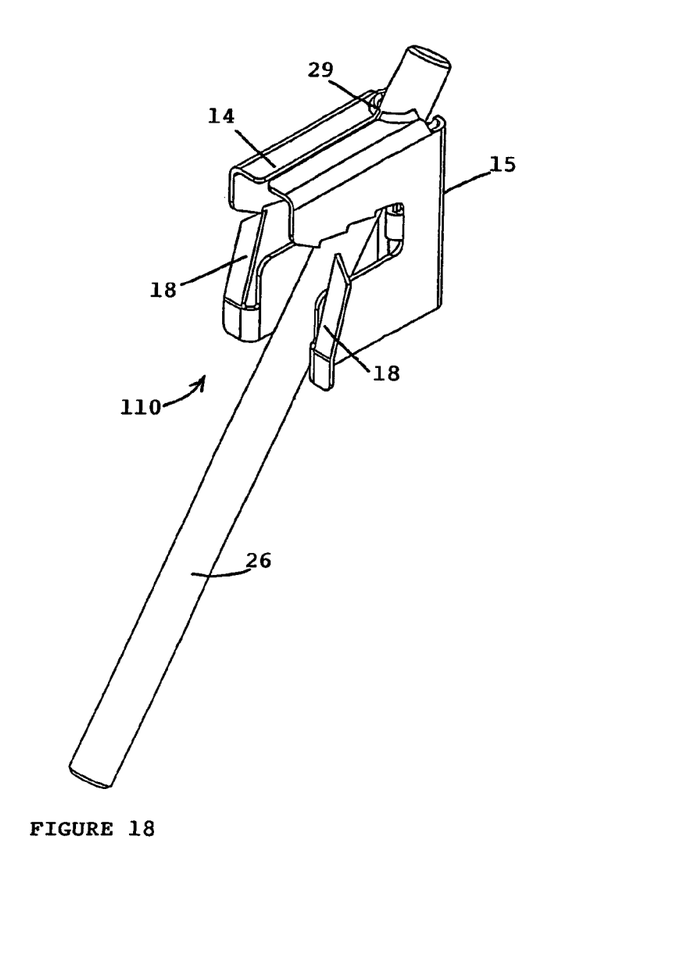

In FIG. 17, the threaded rod 16 extends in the vertical direction, being secured by the first rim 29 and by the striations of the tabs 13c. According to FIG. 18, the threaded rod 16 can be inclined at a predetermined angle, being retained by the two rims 29, 30 and the tabs 13c.

The invention claimed is:

1. Attachment device to be fitted astride a metal support in the form of a beam or a bar comprising:
    a single piece of metal having:
        a U-shaped flange having a top face, a front face and two side faces forming a jaw equipped with rigid top arms and bottom arms, the top face being formed by a portion of each top arm folded at right angles,
    a bottom which is open over the whole depth of the flange,
    a gap extending longitudinally in the middle of the top face up to a passage enabling an element fixed to an inside wall of the front face to be inserted,
    a series of spigots staggered along said top arms,
    a pair of flexible teeth acting as springs at terminal parts of the rigid bottom arms so as to urge the support against the spigots on the top arms without requiring the use of specific tools, and
    securing means for fixing or suspending various elements,
    wherein the two teeth are folded at right angles towards an outside of the gap separating the two side faces, each tooth being able to bend downwards by flexible deformation when the jaw is inserted on the support.

2. Attachment device according to claim 1, wherein each tooth presents a predetermined length enabling a deflection of several millimeters depending on the thickness of the support.

3. Attachment device according to claim 1, wherein the spigots extend along a straight edge of each top arm so as to dig into a metal face of the support situated opposite the flexible teeth.

4. Attachment device according to claim 1, wherein the front face is provided with at least one circular aperture for latching or passage of an element.

5. Attachment device according to claim 1, wherein the front face comprises an outwardly folded latching nose at a top part thereof.

6. Attachment device according to claim 1, wherein the flexible teeth are arranged symmetrically with respect to a vertical mid-plane of symmetry.

7. Attachment device according to claim 1, wherein the top face comprises a first semi-circular rim situated facing a second semi-circular rim arranged at the top of the front face.

8. Attachment device according to claim 1, wherein the attachment device further comprises intermediate tabs directed inside the flange towards the front face to enable pre-positioning of a rod passing through the flange.

9. Attachment device according to claim 8, wherein the tabs are folded to form pins.

* * * * *